Nov. 14, 1967  J. B. LONG  3,352,406
BELT TAKE-UP AND STORAGE UNIT FOR EXTENSIBLE BELT CONVEYORS
Filed March 4, 1964  7 Sheets-Sheet 1

INVENTOR
JOHN B. LONG

BY Rommel, Alwine and Rommel
ATTORNEYS

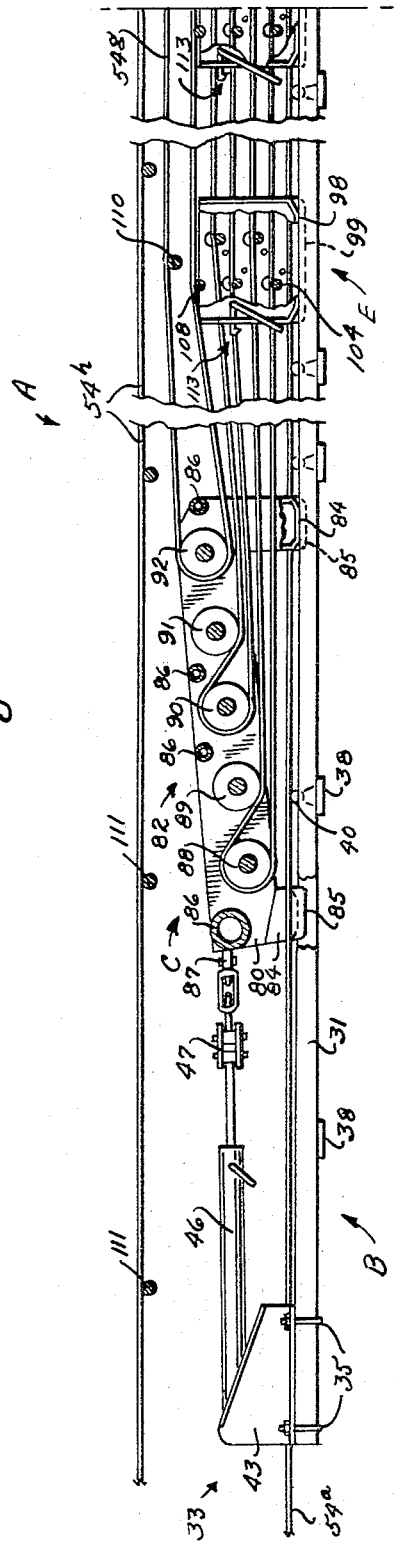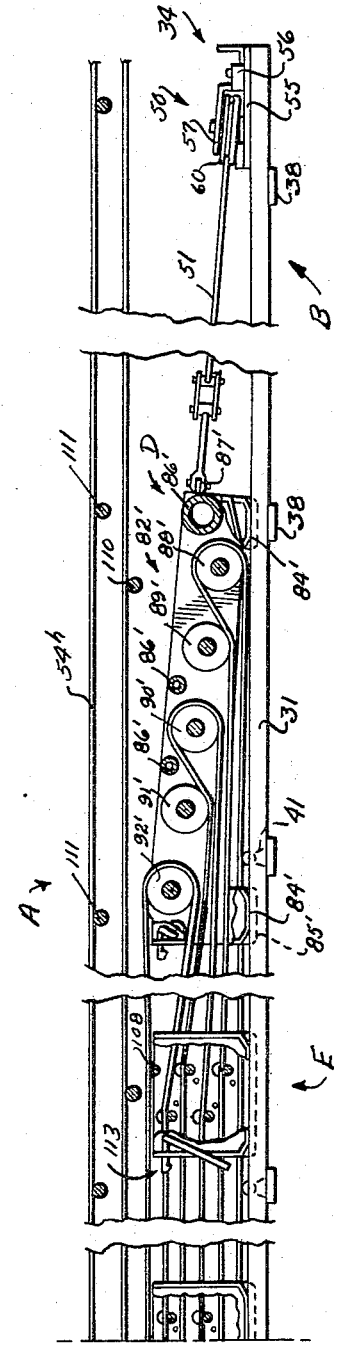

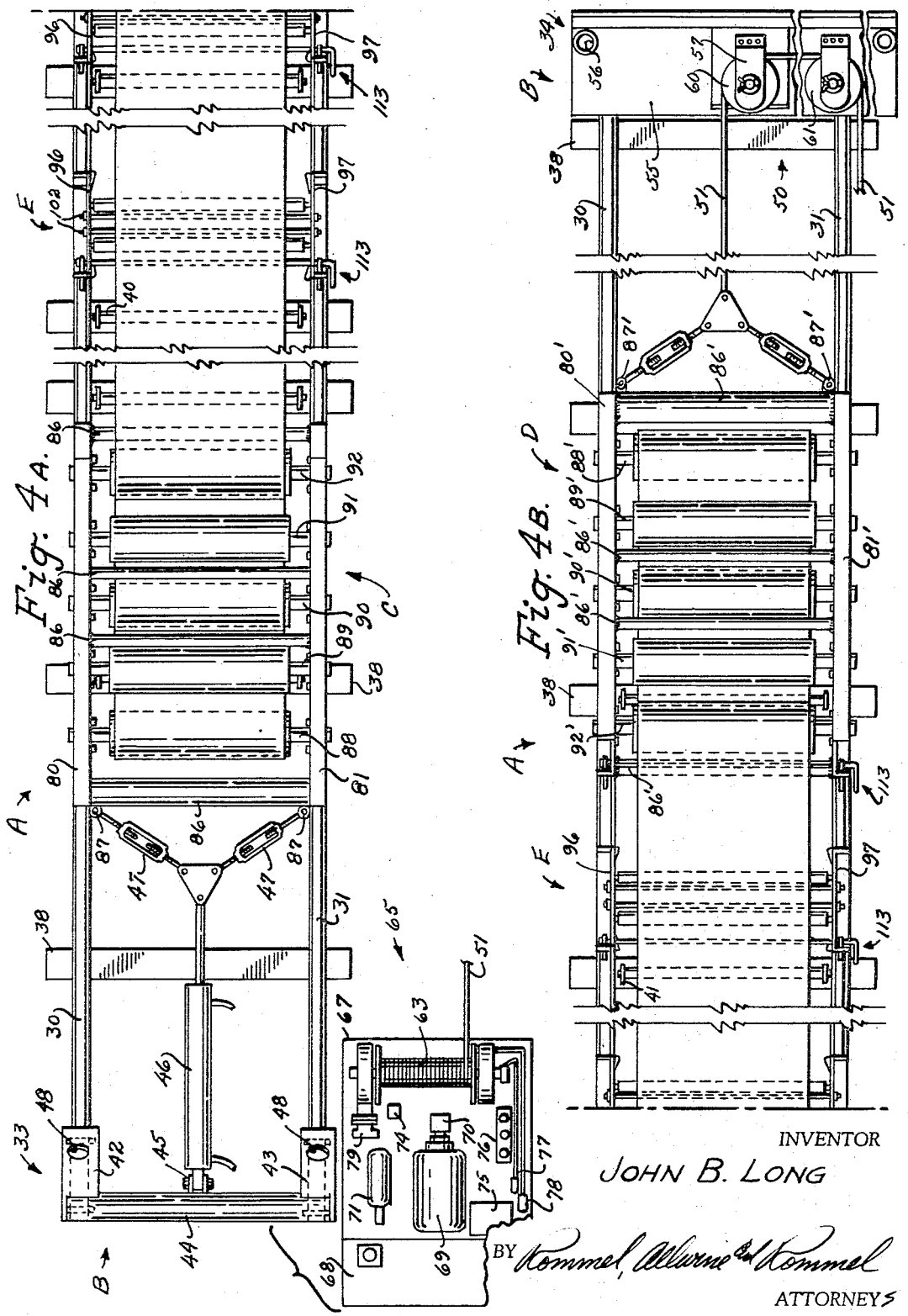

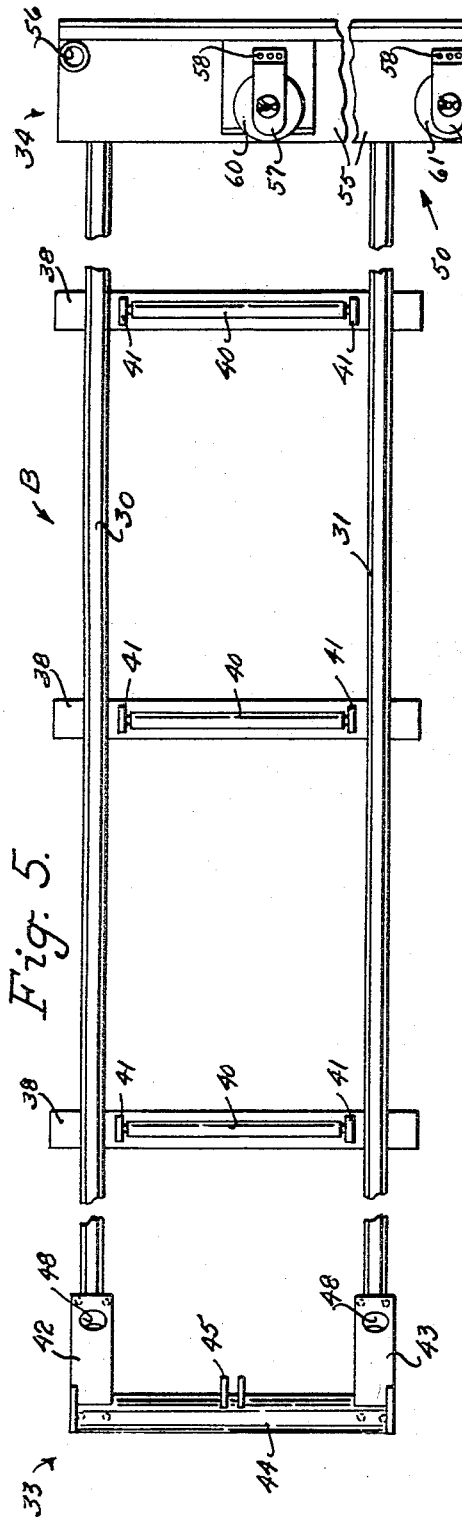

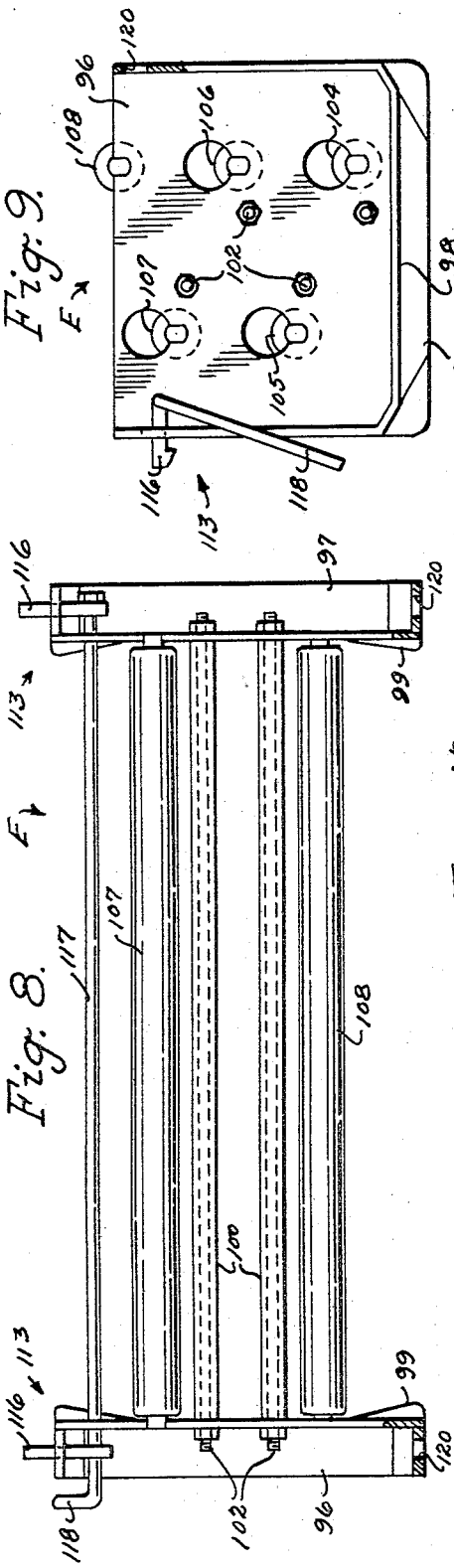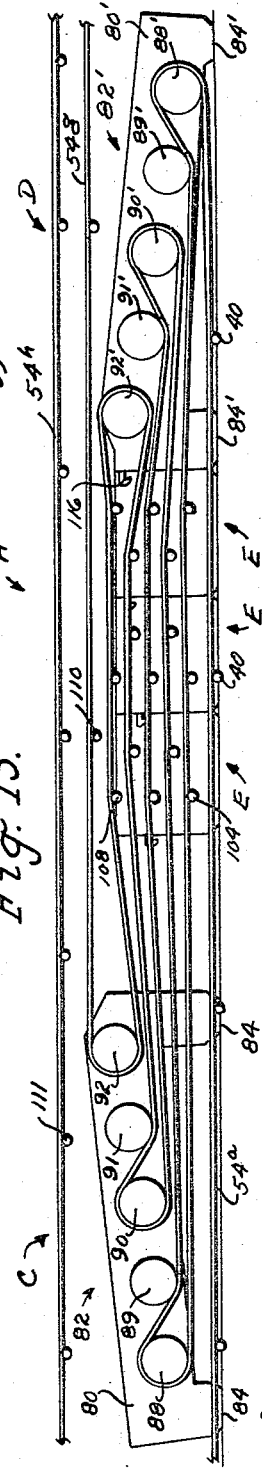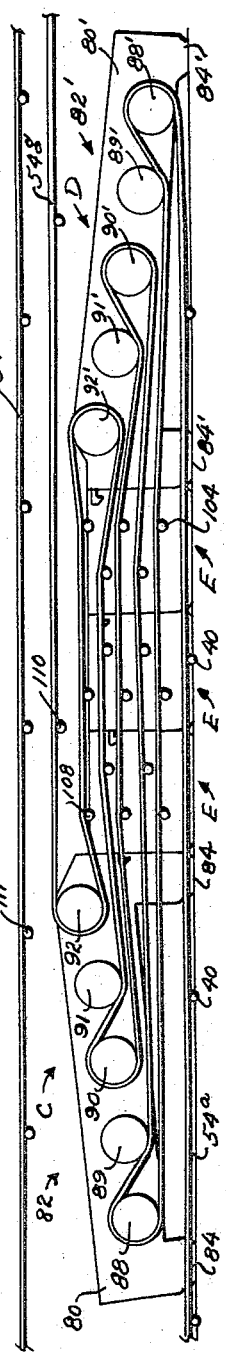

Nov. 14, 1967          J. B. LONG          3,352,406

BELT TAKE-UP AND STORAGE UNIT FOR EXTENSIBLE BELT CONVEYORS

Filed March 4, 1964          7 Sheets-Sheet 6

INVENTOR

JOHN B. LONG

BY Rommel, Alwin and Rommel

ATTORNEYS

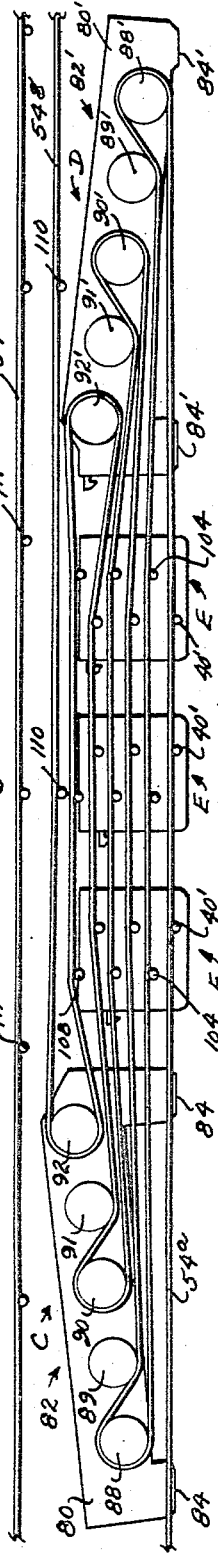
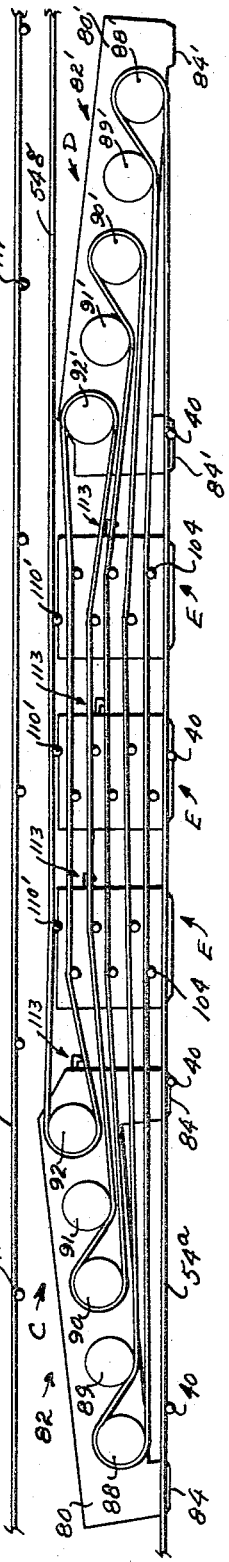
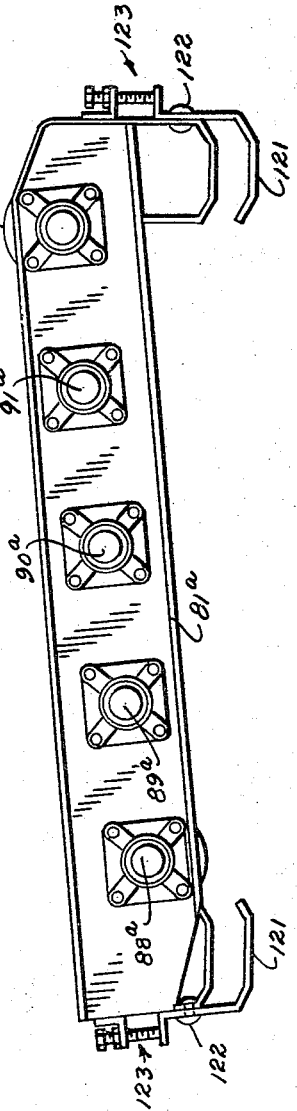
INVENTOR
JOHN B. LONG
BY Rommel, Alwine and Rommel
ATTORNEYS United States Patent Office 3,352,406
Patented Nov. 14, 1967

3,352,406
BELT TAKE-UP AND STORAGE UNIT FOR
EXTENSIBLE BELT CONVEYORS
John B. Long, Oak Hill, W. Va., assignor to Marmon-Herrington Company, Inc., Oak Hill, W. Va., a corporation of Indiana
Filed Mar. 4, 1964, Ser. No. 349,382
15 Claims. (Cl. 198—139)

This invention relates to improvements in belt take-up and storage units for use in extensible belt conveyor systems.

Belt take-up and storage units which have previously been provided for extensible belt conveyor systems have proven largely unacceptable. This is particularly true with respect to extensible belt conveyor systems used in mining operations, where space for receiving and operating the belt take-up and storage unit is at a premium. Belt take-up and storage units previously provided have included various forms of belt receiving pulley assemblies, a pair of pulley assemblies usually being provided, one movable with respect to the other, and with the belting reeved therebetween, the pulley assemblies and cooperating relationship thereof being of an exceedingly complicated nature. It has therefore proven extremely difficult to reeve the belting about the complicated pulley assemblies; there has been a serious problem with respect to rubbing of the belt runs against each other in the storage unit, the rubbing belt runs usually traversing in opposite directions, causing rapid wear and deterioration of the belting and problems with respect to catching of the lacing which interconnects the belt ends together; and there has been a further problem of rotation of the respective pulley assemblies in that the belting is likely to be caught up in the wrong pulley assembly, which would immediately render the unit inoperative. The primary object of my invention is the provision of a belt take-up and storage unit for extensible belt conveyor systems which overcome the various problems of those previously provided.

A further object is the provision of a belt take-up and storage unit for extensible belt conveyor systems including spaced apart pulley assemblies, having runs of belting reeved therebetween, in a vertically spaced apart relationship, so that the uppermost run reeved between the pulley assemblies is shorter than any other run reeved therebetween, and each succeeding run reeved between the pulley assemblies, below the uppermost run thereof, is longer than the next preceding run reeved thereabove. This provides a short radius sag arc for the belting reeved between the pulley assemblies, whereby each belting run has a shorter radius sag arc than the run of reeved belting immediately therebeneath. By this relationship, even though there may be constantly changing tension and length with respect to the belting reeved between the pulley assemblies, gravitational forces will have a greater effect on the longer lengths of reeved belting than the shorter lengths of reeved belting, providing a gravity induced separation of the runs of reeved belting, one from the other. This gravity assisted separation prevents the interference of one reeved belting run with another.

A further object is the provision of a belt take-up and storage unit including spaced apart pulley assemblies with vertically spaced apart runs of belting reeved therebetween, in which all of the runs of the reeved belting, except for the uppermost one thereof, leave and enter the pulleys of the respective pulley assemblies at the bottom of a pulley. Thus, centrifugal force of the rotation of the respective pulleys assists in separation of the belting reeved between the respective pulley assemblies.

Other objects and advantages of the invention will become apparent during the course of the following detailed description, taken in connection with the accompanying drawings, forming a part of this specification, and in which drawings.

Figure 1:
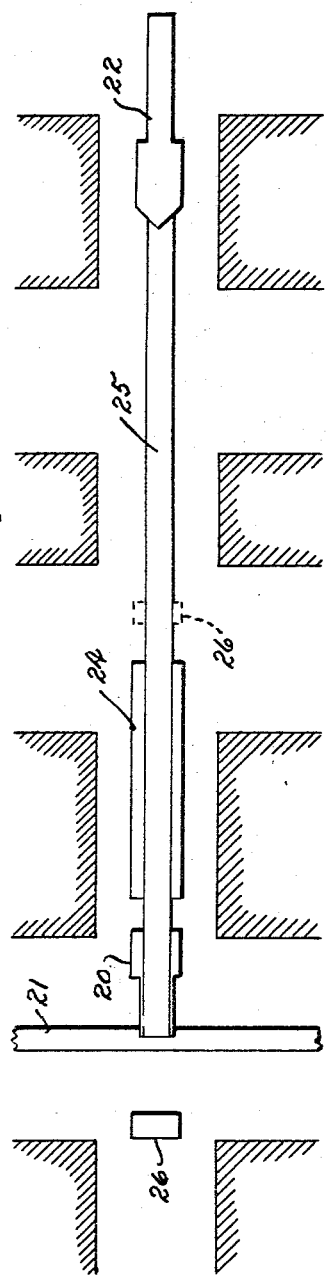
FIG. 1 is a diagrammatic view illustrating the general arrangement of my improved belt take-up and storage unit in an extensible belt conveyor system.

FIGS. 3a and 3b constitute a broken view in side elevation of my improved belt take-up and storage unit for extensible belt conveyor systems.

FIGS. 4a and 4b constitute a broken view in top plan of my improved belt take-up and storage unit for extensible belt conveyor systems.

FIG. 5 is a top plan view of the frame of my improved belt take-up and storage unit.

FIG. 6 is a top plan view of one of the belt receiving means of my improved belt take-up and storage unit.

FIG. 7 is a top plan view of the other of the belt receiving means of my improved belt take-up and storage unit.

FIG. 8 is a side elevation of a separator means of my improved belt take-up and storage unit.

FIG. 9 is an end view of the separator means of FIG. 8.

FIGS. 10, 11, 12, 13 and 14 are somewhat diagrammatic views illustrating the general operation of my improved belt take-up and storage unit.

FIG. 15 is a side elevation illustrating a modified form of belt receiving means.

FIG. 16 is a somewhat diagrammatic view illustrating a modified form of my invention.

FIG. 17 is a somewhat diagrammatic view illustrating still another modified form of my invention.

In the drawings, wherein for the purpose of illustration are shown preferred and modified forms of the invention, and wherein similar reference characters designate corresponding parts throughout the several views, the letter A may generally designate the belt take-up and storage unit of FIGS. 1–14, including frame means B, belt receiving means C and D, and separator means E; F, the belt receiving means of FIG. 15; G, the belt take-up and storage unit of FIG. 16; and H, the belt storage and take-up unit of FIG. 17.

My improved belt take-up and storage unit was primarily developed for use in mining operations, although it is to be understood that the same is not to be construed as limited to this field. There is shown in FIG. 1 a diagrammatic view illustrating a typical extensible conveyor system in which my improved belt take-up and storage unit might be utilized, the same including head section 20, positioned adjacent a "main line" track or belt 21 for discharge of material thereonto from the extensible belt conveyor system; tail section 22 which is spaced apart from head section 20, the same being usually positioned for movement in accordance with mining progress; belt take-up and storage unit 24 located intermediate the head section 20 and tail section 22, in juxtaposition to take up the belt, maintain a tension thereon, and for paying out and storing belt as tail section 22 is advanced and retracted toward and away from head section 20; belting 25 extending between head section 20 and tail section 22, the same being reeved through belt take-up and storage unit 24; and unit 26 for insertion or removal of lengths of belting, which unit 26 is preferably positioned adjacent "main line" track or belt 21, as shown in solid lines, or intermediate belt take-up and storage unit 24 and tail section 22, as shown in dotted lines.

In this arrangement, tail section 22, which may be of the type set forth in my Patent 2,984,333, dated May 16, 1961, is usually advanced in accordance with the mining progress, for mining of the various rooms, entries, breakthroughs, etc., in the usual manner, belt 25 being extended or retracted in accordance with movement of tail section 22.

Belt 25 will extend for a considerable distance from head section 20 to tail section 22, up to and beyond extensions of 2000 to 3000 feet. It is obvious that it would be impractical to add or remove belting with each increment of advance or retraction of tail section 22 with respect to head section 20. Accordingly, a belt take-up and storage unit 24 is provided intermediate head section 20 and tail section 22 for storing belting, for retraction and extension of belting in accordance with movement of tail section 22, for taking up the belt, and for maintaining proper tension on the active conveying run extending between head section 20 and tail section 22. Belting 25 may be supported intermediate head section 20 and tail section 22 by any conventional means, such as the strand supported belt conveyor means of my Patent Nos. 2,896,774, dated July 28, 1959 and 3,105,588, dated Oct. 1, 1963.

My improved belt take-up and storage unit is preferably designed for storage of approximately 500 feet of belting, so that the same will be effective for considerable advancement and retraction of tail section 22 with respect to head section 20. It is obvious that the belt take-up and storage unit may be modified for handling storage of either more or less than 500 feet of belting.

Units 26 for addition of belting are located at the most accessible point, so that belting may be readily added to the extensible belt conveyor system.

The conveying reach of belt 25 extends, in a continuous conveying relationship between tail section 22 and head section 20, the return reach thereof being received in belt take-up and storage unit 24 for paying out and retracting the belting.

Frame means B of belt take-up and storage unit A is most clearly shown in FIG. 5. Frame means B preferably includes a pair of spaced apart, parallel, elongated rails 30 and 31. The rails 30 and 31 comprise a track means upon which the belt receiving means C and D move toward and away from one another in paying out and retracting belting from the belt take-up and storage unit A. The length of rails 30 and 31 may therefore be varied according to the amount of belting which belt take-up and storage unit A is designed to receive, which determines the necessary maximum spacing between belt receiving means C and D.

Terminal assembly 33 is preferably provided at one end of rails 30 and 31, and terminal assembly 34 at the opposite end thereof.

Terminal assembly 33 is preferably fixedly attached to rails 30 and 31 such as by U bolts 35, welding, or any other suitable means. Terminal assembly 34 is likewise preferably welded or otherwise fixedly secured to rails 30 and 31. Cross ties 38 are preferably provided along the length of rails 30 and 31.

In the operation of my improved belt take-up and storage unit, it is extremely important that rails 30 and 31 be maintained in a parallel relationship. In order to maintain this relationship, rails 30 and 31 are perferably fixedly secured to each cross tie 38, and cross ties 38 securely bolted or otherwise fixedly attached to the ground floor surface upon which the unit is to be installed. It may likewise be advisable to fixedly attach terminal assemblies 33 and 34 in a fixed position upon the ground support.

As shown in form A of the invention, the lowermost idler rollers of the belt take-up and storage unit, idler rollers 40, may be rotatably supported upon cross ties 38 by brackets 41.

Terminal assembly 33 preferably includes a pair of side members 42 and 43, side member 42 preferably being disposed for attachment to rail 30, and side member 43 preferably disposed for attachment to rail 31. Support 44 is interconnected to and extends transversely between side members 42 and 43, for maintaining the same in a properly spaced apart relationship on rails 30 and 31, the same likewise serving to maintain the end of rails 30 and 31 adjacent thereto in proper spaced apart parallel relationship. A bracket 45 is preferably provided medially of cross member 44, for attachment thereto of hydraulic tensioning cylinder 46 which is interconnected, such as by attaching means 47, to belt receiving means C, as will be subsequently described.

Side members 42 and 43 may each be provided with a cup 48 for receiving one end of a roof jack assembly which may be utilized for maintaining terminal assembly 33 in a fixed position.

Terminal assembly 34 preferably provides sheave means 50 for receiving a wire rope 51 or other connecting element which regulates movement of belt receiving means D toward and away from belt receiving means C in the storage of belt.

Terminal assembly 34 preferably includes a base plate 55 which extends between and is attached to each rail 30 and 31, for maintaining the same in parallel spaced apart alignment at the opposite end of frame means B from terminal assembly 33, plate 55 being welded or otherwise fixedly attached to each rail 30 and 31.

Plate 55 may be maintained in a fixed position by bolting the same to the ground floor; additionally, cups 56 may be provided for receiving one end of a roof jack assembly which may be utilized for maintaining terminal assembly 34 in a fixed position.

Mounted upon plate 55, by lugs 57 which may be attached to plate 55 by bolts 58, are sheaves 60 and 61. Sheave 60 is preferably spaced between rails 30 and 31 so that one side thereof may receive rope 51 at substantially an intermediate point between rails 30 and 31, and sheave 61 is preferably positioned for receiving rope 51 in a direct line from sheave 60, and for entraining rope 51 outwardly of frame means B, in juxtaposition to be received upon winch assembly 63, as will be subsequently described.

As shown in FIG. 4a, a power unit 65 is preferably provided adjacent the frame means B, the same providing a power source for proper operation of the belt take-up and storage unit. Power unit 65 preferably provides a hydraulic power pack, including frame 67 having tank 68 for receiving hydraulic fluid, electric motor 69, hydraulic pump 70, accumulator 71, winch 63, pressure switch 74, starter box 75, and control valve bank 76. A clutch lever 77 and brake lever 78 may likewise be provided for the winch 63.

Starter box 75 controls operation of electric motor 69 which drives hydraulic pump 70, hydraulic pump 70 supplying hydraulic fluid under pressure, from tank 68 to control valve bank 76.

One valve of control valve bank 76 may be interconnected to a hydraulic motor 79 which drives winch 63 through a conventional clutch arrangement (not shown), the operation of which may be controlled by actuation of clutch lever 77. A conventional brake arrangement (not shown) may be provided for winch 63, the operation of which may be controlled by actuation of brake lever 78.

Another valve of control valve bank 76 may be interconnected to hydraulic tension cylinder 46, through accumulator 71 and pressure switch 74. In this arrangement, accumulator 71 serves to maintain proper pressures in hydraulic tension cylinder 46 and pressure switch operates to release pressure in hydraulic tension cylinder 46 when winch 63 is being operated.

Belt receiving means C preferably comprises a pulley cluster or assembly positioned toward the end of belt take-up and storage unit A adjacent head section 20 of the extensible belt conveyor system, and belt receiving means D a pulley cluster or assembly positioned toward the end of belt take-up and storage unit A adjacent tail section 22 of the extensible belt conveyor system. Belt receiving means C may thus be conveniently referred to as a head pulley cluster and belt receiving means D referred to as a tail pulley cluster.

Belt receiving means C preferably includes a pair of side frame members 80 and 81, which support roller means 82 about which the belting of the extensible conveyor system may be reeved, as will be subsequently described. Side members 80 and 81 are spaced apart in juxtaposition to receive therebetween roller means 82 and are each provided with skid shoes 84. As illustrated, skid shoes 84 of side frame member 80 are positioned for riding upon rail 30, and skid shoes 84 of side frame member 81 are positioned for riding upon rail 31. Each skid shoe 84 includes a flange portion 85 which extends downwardly along the face of the rail upon which it rides in confronting relationship with respect to the opposite rail. In this manner, skid shoes 84 are maintained by the flange portions 85 thereof upon the track means provided by rails 30 and 31, for movement longitudinally therealong.

Side frame members 80 and 81 are held in a fixed spaced-apart relationship by a plurality of cross members 86 extending transversely therebetween. Bracket means 87 may be provided on an endmost cross member 86, for attachment thereto of attaching means 47.

Rollers means 82 of belt receiving means C preferably includes a plurality of idler rollers or pulleys 88, 89, 90, 91, and 92, supported for rotation between side frame members 80 and 81 for receiving a plurality of runs of belting extending longitudinally of frame means B. Pulleys 88, 89, 90, 91 and 92 are preferably disposed with their longitudinal axes of rotation substantially horizontal and parallel to one another, extending between side frame members 80 and 81 in a stepped relationship with the outermost periphery of pulley 88 lowermost, most closely adjacent frame means B and the ground floor upon which the unit is supported and each succeeding pulley 89, 90, 91 and 92 disposed with the outer periphery thereof above the horizontal plane of the outer periphery of the next preceding pulley and more closely adjacent belt receiving means D than the next preceding pulley. The pulleys 88–92 are spaced apart from one another in juxtaposition so that belting may be received therebetween in an appropriate manner, as will be subsequently described.

Belt receiving means D is substantially identical to belt receiving means C, the same likewise including spaced apart side frame members 80' and 81'; roller means 82'; skid shoes 84', each having an internally disposed flange portion 85'; cross member 86'; bracket means 87' for attachement thereto of one end of wire rope 51; roller means 82' including rollers or pulleys 88', 89', 90', 91' and 92'. Pulleys 88'–92' are preferably disposed in substantially the same horizontal and parallel stepped relationship as pulleys 88–92, but with the outer periphery of each pulley more closely adjacent belt receiving means C than that of the next preceding pulley.

Figure 2:
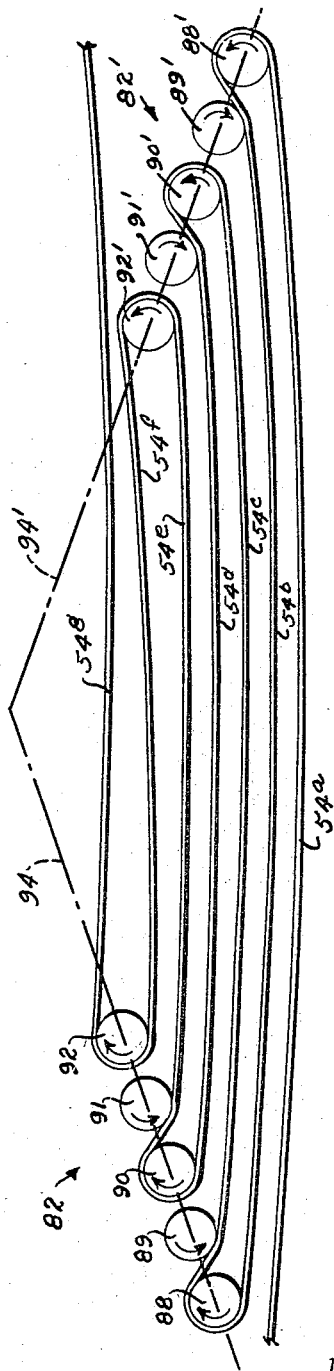
FIG. 2 is a somewhat diagrammatic view illustrating the general relationship in which my improved belt take-up and storage unit supports a plurality of runs of belting.

The primary inventive concept of my invention is the relationship which roller means 82 of belt receiving means C bear to roller means 82' of belt receiving means D, as illustrated somewhat diagrammatically in FIG. 2. As illustrated, conveyor belt return reach 54$^a$ extends from head section 20 to unit A, and thence in a plurality of runs 54$^b$, 54$^c$, 54$^d$, 54$^e$, and 54$^f$ between belt receiving means C and D, with a run 54$^g$ extending from belt take-up and storage unit A to tail section 22. Uppermost pulley 92 of roller means 82 and uppermost pulley 92' of roller means 82' are more closely adjacent to each other than any of the other pulleys of the respective roller means, each succeeding pulley of a roller means, below these uppermost pulleys being spaced further apart from its corresponding pulley of the other roller means than the next preceding pulley thereabove, so that pulleys 91 and 91' are longitudinally spaced apart a slightly greater distance than are the pulleys 92 and 92'; pulleys 90 and 90' are longitudinally spaced apart a slightly greater distance than are pulleys 91 and 91'; pulleys 89 and 89' are longitudinally spaced apart a slightly greater distance than are pulleys 90 and 90'; and pulleys 88 and 88' are longitudinally spaced apart a slightly greater distance than are pulleys 89 and 89'. Such spacing provides a belt run 54$^f$ reeved between pulleys 92 and 92' which is shorter than any of the other runs of belting extending between roller means 80 and 80', with the succeeding runs of belting 54$^e$, 54$^d$, 54$^c$, 54$^b$ and 54$^a$ being respectively longer than the next preceding run thereabove.

It is an obvious fact that an elongated run of belting will sag to a greater extent than a shorter run of belting. Accordingly, belt run 54$^a$ will sag more than run 54$^b$; run 54$^b$ will sag more than run 54$^c$; run 54$^c$ will sag more than run 54$^b$; run 54$^d$ will sag more than runs 54$^e$; and run 54$^e$ will sag more than run 54$^f$. This natural relationship of belt sag, with the shortest radius sag arc 54$^f$ uppermost in my improved belt take-up and storage unit and the longest radius sag arc run 54$^a$ being lowermost in my improved belt take-up and storage unit, with each intermediate run 54$^e$, 54$^d$, 54$^c$ and 54$^b$ each being of a slightly greater radius sag arc than the run immediately thereabove, utilizes the natural force of gravity in the sag relationship in order to maintain the respective runs of conveyor belt separated from one another in my improved belt take-up and storage unit.

Furthermore, guide pulleys 89, 89', 91 and 91' have directions of rotation whereby the centrifugal force of rotation thereof tends to throw the run guided thereby in a further spaced apart position from the run immediately thereabove. This will provide an added feature for separation of the belting runs from one another in the belt take-up and storage unit.

Although I have shown the pulleys of each roller means 82 and 82' to be of the same diameter, it is not a primary requirement that they all be of the same diameter. The primary requirement is that the uppermost run of belting reeved between roller means 82 and 82' be shorter than any other run reeved between roller means 82 and 82', and that each succeeding run of belting reeved between roller means 82 and 82', be longer than the next preceding run thereabove.

As shown in FIG. 2, the preferable arrangement of roller means 82 and 82' is with the respective pulleys thereof in axial alignment such as long angular imaginary lines 94 and 94', with line 94 intersecting line 94' intermediate of and above the respective rollers means 82 and 82', forming a somewhat pyramid-like arrangement of pulleys. Here again, the exact angular relationship of the axes of the respective pulleys of each roller means 82 and 82' is not particularly important so long as the relationship between the lengths of the respective runs of conveyor belting extending between the roller means 82 and 82' is maintained as previously described. Likewise, any number of pulleys may be provided in each roller means 82 and 82', so long as this length relationship between the respective runs of belting extending between the roller means 82 and 82' is maintained, as above described. The relationship as illustrated in FIG. 2 provides six active runs for storing and paying out belting from the belt take-up and storage unit, so that if, for instance, belt receiving means C is spaced apart 85 feet from belt receiving means D, a total of 510 feet of belt may be stored in the belt take-up and storage unit.

Even though the relationship of roller means 82 and roller means 82' is such as to maintain the runs reeved thereabout separated from one another, it is nevertheless desirable, in a run of belting which may extend for more than 85 feet, to provide some form of intermediate belt support. Accordingly, I have provided a plurality of separator means E mounted on frame means B intermediate belt preceiving means C and D.

Separator means E are substantially identical to each other, each preferably including spaced apart side frames 96 and 97, which side frames 96 and 97 are each provided with skid shoes 98 and spaced apart from each other in juxtaposition so that skid shoe 98 of side frame member 96 will ride upon rail 30 and skid shoe 98 of side frame 97 will ride upon rail 31. Each side shoe 98 is provided with a flange portion 99, positioned to extend adjacent the respective rail upon which it slides, to the side thereof nearest the opposite rail, for maintaining the separator means in its longitudinal sliding relationship along rails 30 and 31. Spacer pipes 100 and tie bars 102 are interconnected between side members 96 and 97 for maintaining them in the proper spaced apart position.

As shown in form A of the invention, a plurality of idler rollers 104, 105, 106, 107 and 108 are mounted to extend transversely between side members 96 and 97, each respectively supporting a run of the belt. As shown in form A of the invention, idler rollers 40 mounted on cross ties 38 of frame means B will support run $54^a$; roller 104 of each separator means E will support run $54^b$; and succeeding rollers 105, 106, 107 and 108 of each separator means will respectively support runs $54^c$, $54^d$, $54^e$, and $54^f$. Run $54^g$ of the belt will be supported upon idler rollers 110, which may be themselves supported on or from a separate standard. Conveying run $54^h$ of the belt be supported upon independently supported rollers 111.

In order to maintain proper spacing of separator means E from each other, and between the respective belt receiving means C and D and the separator means E adjacent thereto, each separator means E and belt receiving means D are provided with latch means 113.

Each latch means 113 preferably includes a pair of latch hooks 116, pivoting cross bar 117, and handle portion 118. Latch means 113 is provided on belt receiving means D with a hook 116 extending from each side frame member 80' and 81' thereof, toward belt receiving means C; each separator means E is provided with latch means 113 having a hook 116 extending from each side frame member 96 and 97 toward belt receiving means C; and the opposite sides of each separator means E and the end of side frame members 80 and 81 of belt receiving means C are provided with an opening 120, for receiving a hook 116 of latch means 113, to the side thereof which is most closely adjacent belt receiving means D.

In operation, belt take-up and storage unit A will be positioned in the extensible conveyor system substantially as shown in FIG. 1, with belt receiving means C thereof most closely adjacent head section 20 and belt receiving means D thereof most closely adjacent tail section 22, so that belt receiving means C becomes the head pulley cluster and belt receiving means D becomes the tail pulley clustre. Frame means B is then fixedly secured in position, and belting is added to the system, the same being readily reeved through belt take-up and storage unit A, with respective belt receiving means C and D and separator means E thereof being spaced apart substantially as shown diagrammatically in FIG. 10. In this position, belt receiving means C is spaced apart from separator means E next adjacent thereto, each separator means E is spaced apart from the other, and belt receiving means D is spaced apart from separator means E next adjacent thereto. Assuming that a 500 foot length of belting is to be received by belt take-up and storage unit A, there will be approximately a 20 foot spacing between each belt receiving means C and D and its next adjacent separator means E, and approximately a 20 foot spacing between adjacent separator means E. Winch 63 is operated to secure this spaced apart relationship, and hydraulic tensioning cylinder 46 is actuated, retracting belt receiving means C toward terminal assembly 33, to apply proper tension to the belting stored in the belt take-up and storage unit. Hydraulic tensioning cylinder 46 preferably has approximately a 5 foot travel for maintaining tension in the belt stored in the belt take-up and storage unit, providing approximately a 30 foot belt take-up for maintaining tension in the belt.

Now, assuming that it is desired to pay out belt from the belt take-up and storage unit, tension on cylinder 46 is released, by activation of pressure switch 74, winch brake lever 78 released, winch clutch lever 77 disengaged, and tail section 22 moved away from head section 20 to a desired position; whereupon winch brake lever 78 is set, winch clutch lever 77 reengaged, and tension reapplied to cylinder 46. Each increment of advancement of tail section 22 away from head section 20 is accomplished in a like manner. When belt is thus payed out from belt take-up and storage unit A, wire rope 51 will be fed from winch 63, permitting belt receiving means D to move toward belt receiving means C.

Each increment of paying out of belt from the belt takeup and storage unit will decrease the spacer-apart position between belt receiving means C and D, in a series of steps as illustrated in FIGS. 10–14. As belt receiving means D approaches and abuts against separator means E next adjacent thereto, latch means 113 of belt receiving means D will be actuated in a manner so that hook member 116 thereof is received within a slot 120 of each side frame member of next adjacent separator means E; as each separator means E abuts against next adjacent separator means E, hook 116 of latch means 113 of separator means E in abutment and which is most closely adjacent belt receiving means D will, in a like manner, engage slots 120 of the respective side members 96 and 97 of the next adjacent separator means E, until a position as is shown in FIG. 14 is reached, at which position belt receiving means C is latched onto separator means E next adjacent thereto, by latch means 113 of such next adjacent separator means E, each succeeding separator means E is interconnected to preceding separator means E by latch means 113 of the succeeding separator means E, and belt receiving means D is latched onto separator means E next adjacent thereto.

Now, when it is desired to retract tail section 22 toward head section 20, or when more belt is to be added to the system, which would require re-extension of belt take-up and storage unit A, to a position as shown in FIG. 10, tension on cylinder 46 is released, brake lever 78 of winch 63 is released, and winch 63 is operated to wind up wire rope 51. This winding up of wire rope 51 on winch 63 will pull belt receiving means D away from belt receiving means C. When winch 63 is operated to wind up wire rope 51, latch means 113 of separator means E next adjacent belt receiving means C is disengaged from belt receiving means C, but remains attached to belt receiving means D through interconnection therewith of intermediate separator means E, so that movement of belt receiving means D away from belt receiving means C pulls separator means E next adjacent belt receiving means C away from belt receiving means C. When separator means E next adjacent belt receiving means C has been moved an appropriate distance, such as a spacing of 20 feet, latch means 113 of central separator means E will be actuated, releasing central separator means E from separator means E which is next adjacent belt receiving means C, which leaves separator means E next adjacent belt receiving means C at its proximate 20 foot spacing from belt receiving means C, central separator means E and separator means E next adjacent belt receiving means D continuing to move away from both belt receiving means C and separator means E next adjacent thereto in accordance with movement of belt receiving means D. A like procedure is followed with respect to spacing of central separator means E and separator means E next adjacent to belt receiving means D. This spacing apart of the respective units from one another may be accomplished by hand, by lifting handle 118 of respective latch means 113, or some form of actuating unit (not shown) may be positioned adjacent thereto for automatic operation of respective latch means 113 as each separator means reaches the position at which it is desired to be situated.

It is to be noted that belt receiving means C and D of form A of the invention are substantially identical, except that roller means 82 of belt receiving means C is positioned slightly higher above rails 30 and 31 than is roller means 82' of belt receiving means D. It thus becomes obvious that it may be desirable to manufacture only a single belt receiving means, including some means for providing roller means 82 of belt receiving means C at a higher position above rails 30 and 31 than roller means 82' of belt receiving means D. This can be very easily accomplished, as shown in FIG. 15, by the provision of height adjustable skid shoes 121 on belt receiving means F.

Belt receiving means F is identical to belt receiving means C, except for skid shoes 121, and identical reference characters with a prime letter "a" added have been applied to the parts of belt receiving means F which correspond to identical parts of belt receiving means C.

In belt receiving means F, skid shoes 121 are slidably supported on side frame 81ª by fastener means 122, the same being maintained at an appropriate extension therefrom by bolt means 123.

By utilizing belt receiving means F, only one type of belt receiving means needs to be manufactured, the same being adaptable to perform and function identical to belt receiving means C and D by mere extension or retraction of skid shoes 120.

In some cases, it may not be desirable to support idler rollers 40 upon ties 38 of frame means 80. In this case, an idler roller 40' may be provided on each separator means E, as shown in form G of the invention, illustrated in FIG. 16. Form G is otherwise identical to form A, and identical reference characters have been applied to corresponding parts.

In certain other installations, it may be desirable to reverse frame means B, so that tension cylinder 46 is adjacent belt receiving means D, and belt receiving means C is the belt receiving means which moves with respect to belt receiving means D in extension and retraction of belting with respect to belt storage and take-up unit. Form H of the invention, as shown in FIG. 17, illustrates this setup. When this arrangement is utilized, latch means 113 is provided on belt receiving means C but not on belt receiving means D, separator means E are reversed, so that latch means 113 thereof extends towards belt receiving means D, and an idler pulley 110' is provided on each separator means E for supporting belt run 54ᵍ.

Various changes may be made to the forms of the invention herein shown and described, without departing from the spirit of the invention or the scope of the following claims.

I claim:

1. A unit for storing and paying out conveyor belt to permit variations in spacing between two belt terminal points including means for supporting a plurality of vertically spaced belt runs with the uppermost run thereof shorter than any other run thereof and each succeeding run below the uppermost run thereof longer than the next preceding run thereabove.

2. In a unit for storing and paying out conveyor belt to permit variations in spacing between belt terminal points, the combination of elongated frame means, first and second belt receiving means, means for mounting said belt receiving means on said frame means with at least one of said belt receiving means being longitudinally movable along said frame means toward and away from the other of said belt receiving means in accordance with variations in the spacing between the belt terminal points, each belt receiving means including roller means, said roller means being spaced apart and disposed with respect to each other in juxtaposition for supporting a plurality of belt runs extending between said spaced apart roller means in a plurality of vertically spaced part runs with the uppermost run thereof shorter than any other run extending between said roller means and each succeeding run extending between said roller means below the uppermost run thereof longer than the next preceding run thereabove.

3. A unit as specified in claim 2 including separator means having a plurality of idler roller means positioned for supporting runs of belting extending between said roller means, and means for mounting said separator means on said frame means for movement longitudinally along said frame means intermediate said first and second belt receiving means in juxtaposition for movement longitudinally along said frame means by abutment with said movable one of said belt receiving means as it moves toward the other of said belt receiving means.

4. A unit as specified in claim 3 wherein said movable one of said belt receiving means includes latch means, means provided on said separator means for receiving said latch means, said latch means including means for cooperative interaction with said last mentioned means to attach said movable one of said belt receiving means and said separator means together as a unit for movement longitudinally along said frame means with said movable one of said belt receiving means and operable to release said separator means from attachment to said movable one of said belt receiving means at a predetermined position along said frame means.

5. A unit as specified in claim 3 including a plurality of separator means, each said separator means including a plurality of roller means positioned for supporting runs of belting extending between said roller means, means for mounting said separator means on said frame means for movement longitudinally along said frame means and consecutively intermediate said first and second belt receiving means in juxtaposition for movement of said separator means next adjacent said movable one of said belt receiving means by abutment with said movable one of said belt receiving means as it moves toward the other of said belt receiving means and consecutive movement of the other separator means by abutment with the separator means next adjacent thereto in the direction of said movable one of said belt receiving means as said movable one of said belt receiving means moves toward the other of said belt receiving means.

6. A unit as specified in claim 5 wherein said movable one of said belt receiving means and said separator means include latch means, means provided on each said separator means for receiving a latch means, each said latch means including means for cooperative interaction with said last mentioned means to attach said movable one of said belt receiving means to the separator means next adjacent thereto and said separator means to one another as a unit for movement longitudinally along said frame means with said movable one of said belt receiving means and operable to release said separator means from attachment to one another and from attachment of said belt receiving means to the separator means next adjacent thereto at predetermined positions along said frame means.

7. A unit as specified in claim 3 wherein a run of belting extends outwardly from each end of the unit, said idler roller means of said separator means are juxtaposed to respectively support the runs of belt extending between said roller means, and said frame means includes idler roller means for supporting the run of belting extending outwardly from one end of the unit.

8. A unit as specified in claim 3 wherein a run of belting extends outwardly from each end of the unit, and said idler roller means of said separator means are juxtaposed to respectively support the runs of belt extending between said roller means and the run of belting extending outwardly from one end of the unit.

9. A unit as specified in claim 3 wherein a run of belting extends outwardly from each end of the unit, said idler roller means of said separator means are juxtaposed to respectively support the runs of belt extending between said roller means and the run of belting extending outwardly from one end of the unit, and said frame means includes idler roller means for supporting the run of belting extending outwardly from the other end of the unit.

10. A unit as specified in claim 2 wherein said first and second belt receiving means include means for vertical positioning thereof in alignment of said roller means with respect to each other.

11. A unit as specified in claim 10 wherein said belt receiving means includes a frame, said last mentioned means comprises a skid shoe for slidably supporting said belt receiving means on said frame means and means for vertical positioning of said skid shoe with respect to said frame of said belt receiving means.

12. A storage device for a conveyor belt to permit variation in the effective conveying length thereof including elongated frame means, first belt receiving means, second belt receiving means, means for mounting said belt receiving means on said frame with at least one of said belt receiving means being longitudinally movable along said frame means toward and away from the other of said belt receiving means, each said belt receiving means including a pulley cluster comprising a plurality of spaced apart pulleys having parallel longitudinal axes of rotation, the longitudinal axes of rotation of the pulleys of each said pulley cluster being disposed in a common plane and said pulley clusters being juxtaposed with respect to each other so that an extension of the common plane of the longitudinal axes of rotation of the pulleys of the pulley cluster of said first belt receiving means intersects an extension of the common plane of the longitudinal axes of rotation of the pulleys of the pulley cluster of said second belt receiving means at a point above and intermediate of said belt receiving means.

13. A storage device for a conveyor belt to permit variation in the effective conveying length thereof including elongated frame means; first and second roller means mounted on said frame means; means for mounting said roller means on said frame means with at least one of said roller means being longitudinally movable along said frame means with respect to the other of said roller means for variation in spacing between said roller means; said first roller means including at least two pulleys with their longitudinal axes of rotation substantially horizontal and parallel, said pulleys being disposed with respect to each other with at least a periphery of one pulley being above the horizontal plane of the next adjacent pulley; said second roller means including at least two pulleys with their longitudinal axes of rotation substantially horizontal and parallel, said pulleys of said second roller means being disposed with respect to each other in a spaced apart position from the pulleys of said first roller means, with at least a portion of the periphery of one pulley of said second roller means being above the horizontal plane of the next adjacent pulley of said roller means; the first named pulleys of said first and second roller means being spaced nearer each other than are the second named pulleys of said first and second roller means.

14. In a belt storage unit for an extensible belt conveyor, the combination of elongated substantially horizontal frame means, a first belt receiving means, second belt receiving means, means for mounting each said belt receiving means on said frame means with at least one of said belt receiving means movable longitudinally along said frame means toward and away from the other of said belt receiving means, each said belt receiving means including a plurality of rollers mounted in a substantially horizontally spaced apart relation in juxtaposition to receive a plurality of substantially horizontally extending and substantially vertically spaced apart runs of belt reeved between said belt receiving means in juxtaposition for paying out and storing belting as the distance between said belt receiving means respectively decreases and increases, the axis of rotation of each said roller of at least one said belt receiving means being vertically disposed in spaced apart position with respect to the longitudinal axis of rotation of each said other roller thereof in juxtaposition so that the roller having the uppermost longitudinal axis of rotation is more closely adjacent the other belt receiving means than any of the other rollers thereof and each succeeding roller having a longitudinal axis of rotation below said roller having the uppermost longitudinal axis of rotation is disposed more distant from the other belt receiving means than the next preceding roller thereabove, said rollers of one said belt receiving means being disposed with respect to the rollers of the other said belt receiving means in juxtaposition so that the uppermost run of belting reeved between said belt receiving means is shorter than any other run of belting reeved between said belt receiving means and has a shorter catenary sag arc between said belt receiving means than any other run of belt reeved between said belt receiving means; and each succeeding run of belting reeved between said belt receiving means below the uppermost run of belting reeved between said belt receiving means is longer than the next preceding run of belting reeved between said belt receiving means and has a longer catenary sag arc between said belt receiving means than any other run of belt reeved between said belt receiving means thereabove.

15. In a belt storage unit for extensible belt conveyor the combination of elongated frame means, first belt receiving means, second belt receiving means, means for mounting said belt receiving means on said frame with at least one of said belt receiving means movable longitudinally along said frame toward and away from the other of said belt receiving means, each said belt receiving means including roller means, the roller means of each said belt receiving means being disposed with respect to each other in juxtaposition to receive a plurality of vertically spaced apart belt runs extending longitudinally between said belt receiving means with the uppermost run reeved between said belt receiving means shorter than any other run reeved between said belt receiving means and each succeeding run reeved between said belt receiving means below the uppermost run thereof longer than the next preceding run thereabove reeved between said belt receiving means.

References Cited
UNITED STATES PATENTS

| | | | |
|---|---|---|---|
| 2,992,723 | 7/1961 | Poundstone | 198—139 |
| 3,125,209 | 3/1964 | Butler et al. | 198—139 X |
| 3,158,253 | 11/1964 | Reilly | 198—139 |

EVON C. BLUNK, *Primary Examiner.*

R. J. HICKEY, *Assistant Examiner.*